United States Patent
Eun et al.

(10) Patent No.: US 7,328,341 B1
(45) Date of Patent: Feb. 5, 2008

(54) METHOD AND APPARATUS FOR PROTECTING FILE SYSTEM BASED ON DIGITAL SIGNATURE CERTIFICATE

(75) Inventors: You-Jin Eun, Kyoungki-do (KR); Ki-Yoong Hong, Kyoungki-do (KR); Min-Goo Lee, Kyoungki-do (KR); Jae-Myung Kim, Seoul (KR)

(73) Assignee: Secuve Co., Ltd, Kyoungki-do (KR)

( * ) Notice: Subject to any disclaimer, the term of this patent is extended or adjusted under 35 U.S.C. 154(b) by 853 days.

(21) Appl. No.: 09/926,594

(22) PCT Filed: Aug. 9, 2000

(86) PCT No.: PCT/KR00/00875

§ 371 (c)(1),
(2), (4) Date: Nov. 23, 2001

(87) PCT Pub. No.: WO01/80482

PCT Pub. Date: Oct. 25, 2001

(30) Foreign Application Priority Data

Apr. 14, 2000 (KR) ................................ 2000-19727

(51) Int. Cl.
*H04L 29/00* (2006.01)
(52) U.S. Cl. ....................... 713/165; 713/176
(58) Field of Classification Search ............... None
See application file for complete search history.

(56) References Cited

U.S. PATENT DOCUMENTS

| | | | |
|---|---|---|---|
| 5,029,206 A * | 7/1991 | Marino et al. | 713/164 |
| 5,214,702 A | 5/1993 | Fischer | |
| 5,289,540 A * | 2/1994 | Jones | 713/165 |
| 5,315,657 A * | 5/1994 | Abadi et al. | 713/201 |
| 5,987,123 A * | 11/1999 | Scott et al. | 713/165 |
| 6,212,635 B1 * | 4/2001 | Reardon | 713/165 |
| 6,249,866 B1 * | 6/2001 | Brundrett et al. | 713/165 |
| 6,615,349 B1 * | 9/2003 | Hair | 713/165 |
| 6,711,263 B1 * | 3/2004 | Nordenstam et al. | 380/282 |

(Continued)

FOREIGN PATENT DOCUMENTS

EP 0386867 9/1990

(Continued)

OTHER PUBLICATIONS

Stein, L., Web Security—A Step-by-Step Reference Guide, 1998, Addison-Wesley, pp. 292-307.*

(Continued)

*Primary Examiner*—Gilberto Barrón
*Assistant Examiner*—Minh Dinh
(74) *Attorney, Agent, or Firm*—Greenblum & Bernstein, P.L.C.

(57) ABSTRACT

Protection for a file system is provided. The protection includes generating first digital signature keys and a system security manager's certificate for a system security manager. A system security manager's certificate is stored onto a security kernel when installing an operating system on a server computer. Second digital signature keys and a user's certificate are generated for a general user. An access authority of the file system is set. A user is identified through a digital signature authentication method when the user tries to access the file system. The user is given access authority for the file in accordance with an identification result.

33 Claims, 13 Drawing Sheets

U.S. PATENT DOCUMENTS 6,754,829 B1 * 6/2004 Butt et al. .................. 726/8
6,950,932 B1 * 9/2005 Lavian et al. ............... 713/151

FOREIGN PATENT DOCUMENTS

| JP | 4-245368 | 9/1992 |
| JP | 6-103076 | 4/1994 |
| JP | 10-326256 | 8/1998 |
| JP | 11346210 | 12/1999 |
| JP | 2002-523816 | 7/2002 |
| KR | 99-30983 | 5/1999 |
| KR | 99-46783 | 7/1999 |
| KR | 00-29343 | 5/2000 |

OTHER PUBLICATIONS

Stallings, W., Cryptography And Network Security—Principles And Practice, 1999, Prentice Hall, 2nd Edition, pp. 444-461.*

Atis Telecom Glossary 2000, 2001, Alliance for Telecommunications Industry Solutions, Retrieved from the Internet on Jan. 21, 2006: <URL: http://www.atis.org/tg2k/t1g2k.html>.*

O'Connell et al, JFS: A Secure Distributed File System for Network Computers, 1999, Trinity College Dublin, Retrieved from the Internet on Jan. 21, 2006: <URL: https://www.cs.tcd.ie/publications/tech-reports.99/TCD-CS-1999-11.pdf>.*

Thompson et al, Certificate-Based Access Control For Widely Distributed Resources, Aug. 1999, USENIX Association, Retrieved from the Internet on Jan. 21, 2006: <URL: http://citeseer.ist.psu.edu/cache/papers/cs/20178/http:zSzzSzwww.ktsi.comzSzcarloszSzpaperszS.*

Microsoft Windows 2000 Public Key Infrastructure, Apr. 1999, Microsoft Corporation, Retrieved from the Internet on Sep. 17, 2006 <URL: http://msdn.microsoft.com/library/en-us/dnsecure/html/pki.asp>.*

Ames et al., "Security Kernel Design and Implementation: An Introduction", IEEE, 1983, Retrieved from the Internet on Mar. 7, 2007: URL: <http://ieeexplore.ieee.org/iel5/2/34683/0654439.pdf?tp=&isnumber=34683&arnumber=1654439>.*

User Management Policy of Windows NT by Xie Jin Bao et al., published in 1996.

User Management and Application thereof under Windows NT by Wei, published in 1997.

English Language Abstract of JP 10-326256.

English Language Abstract of JP 6-103076.

English Language Abstract of WO 2000/010303.

English Language Abstract of JP 4-245368.

Deborah Russell et al., "Computer Security Basics", dated Dec. 1, 1994, pp. 142-143.

IBM, "Dispersion Computing Environment", GC88-6493-00, dated Jan. 31, 1997, pp. 63-68.

* cited by examiner

METHOD AND APPARATUS FOR PROTECTING FILE SYSTEM BASED ON DIGITAL SIGNATURE CERTIFICATE

FIELD OF THE INVENTION

The present invention relates to a method and apparatus for protecting a file system; and, more particularly to a method and apparatus for protecting a file system based on a digital signature certificate in a computer system.

PRIOR ART OF THE INVENTION

In a conventional computer system, in order to protect a sever computer, an access control method or one-time password is used.

The computer system using the access control method permits a certain user to access only predetermined services or network addresses. In other words, the computer system prevents a user having no access authority from accessing except for the predetermined service or the predetermined network address.

A general password used for identifying a user is registered once and continually used until another password is registered. In order to prevent a malicious user from making a fraudulent use of the password, the one-time password is used. The one-time password means a password that is used only one time.

However, since a hacking method which a malicious hacker can obtain an authority of a system security manager or a general user by only accessing the predetermined service or network address has been introduced, interception of access to a certain service or network can not substantially protect the file system from the malicious hacker trying to forge or to alter the file system, e.g., a home page.

Various hacking techniques make partial security function of the one-time password powerless.

The problems of the access control method and one-time password result from a computer operating system that provides the conventional security technique implemented in application program, user or network level.

SUMMARY OF THE INVENTION

Therefore, it is an object of the invention is to provide a method and apparatus for protecting a file system.

It is another object of the invention is to provide a safe and stable computer system.

In accordance with an aspect of the present invention, there is provided a method for protecting a file system in a computer, wherein a user having an access authority for a file can access the file system in the computer, the method comprising the steps of: a) generating system security manager's digital signature keys and system security manager's certificate; b) storing system security manager's certificate onto a security kernel when installing an operating system on a server computer; c) generating second digital signature keys and user's certificate; d) setting an access authority of the file system; e) identifying a user through a digital signature based authentication when the user tries to access the file system; and f) giving the user the access authority for the file in accordance with identification result.

In accordance with another aspect of the present invention, there is provided an apparatus for protecting a file system in a computer system, wherein a user having a file access authority can access the file system in the computer system, the apparatus comprising: means for generating system security manager's digital signature keys and system security manager's certificate; means for storing system security manager's certificate onto a security kernel when installing an operating system on a server computer; means for generating user's digital signature keys and user's certificate; means for setting an access authority of the file system; means for identifying a user through a digital signature authentication method when the user tries to access the file system; and means for giving the user the access authority for the file in accordance with identification result.

BRIEF DESCRIPTION OF THE DRAWINGS

The above and other objects and features of the instant invention will become apparent from the following description of preferred embodiments taken in conjunction with the accompanying drawings, in which.

PREFERRED EMBODIMENTS OF THE INVENTION

Hereinafter, preferred embodiments of the present invention will be described in detail with reference to the accompanying drawings.

Figure 1:
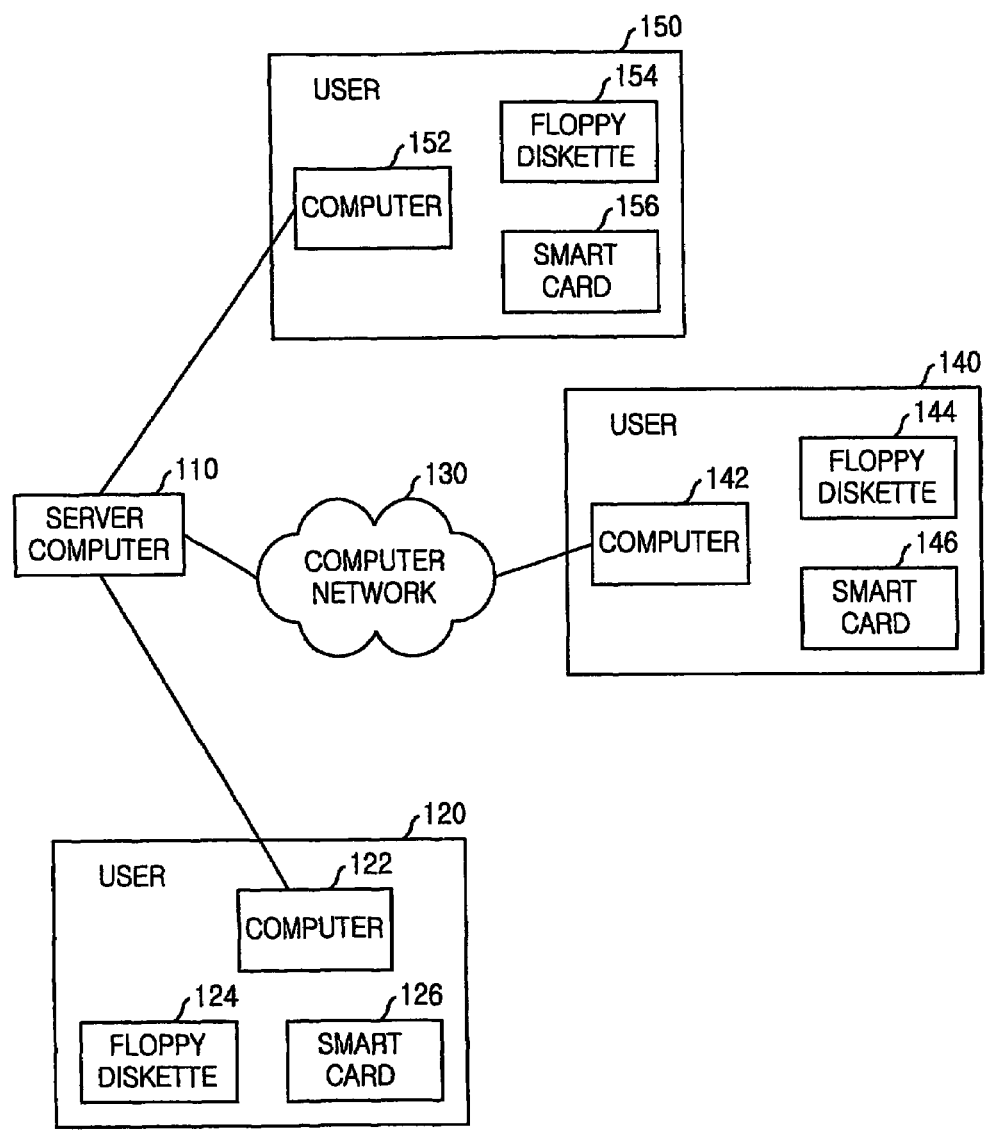
FIG. 1 is a diagram of a computer system to which the present invention is applied.

FIG. 1 is a diagram of a computer system to which the present invention is applied.

The computer system includes a sever computer 110 and computers 120, 140 and 150 for a system security manager, a user at a remote distance and a user at a short distance from the server computer 110.

Each of computers 120, 140 and 150 has a storage device such like a floppy diskette 124, 144 and 154 and a smart card 126, 146 and 156. The sever computer 110 and the computers 120, 140 and 150 are connected to each other in direct or through a computer network 130.

The system security manager manages the sever computer 110 and users of the sever computers 110 after obtaining authentication based on digital signature.

The user 150 at a short distance from the sever computer 110 can access a part of files after being identified based on digital signature. The part of files are allowed to be accessed by the user. The system security manager sets an access authority of a file and an access authority of a user.

The user 140 at a remote distance from the sever computer 110 can access a part of files allowed to be accessed by the user after being identified based on digital signature generated by communications through a computer network.

Figure 2:
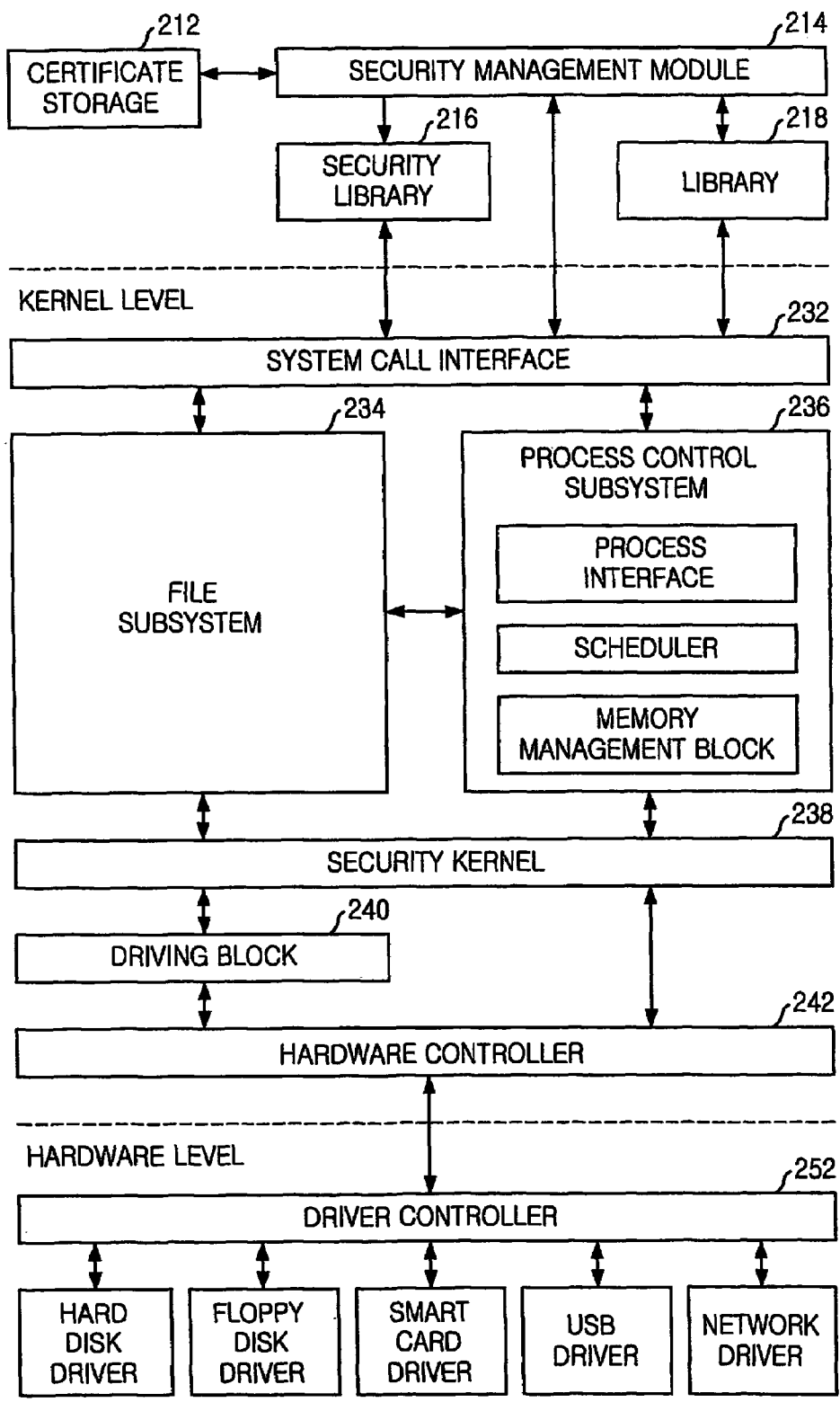
FIG. 2 is a detailed diagram of a server computer in accordance with the present invention.

FIG. 2 is a detailed diagram of a server computer in accordance with the present invention.

The server computer includes a plurality of elements in a user level, a kernel level and hardware level.

The user level of the server computer includes a certificate storage block 212, a security management module 214, a security library 216, and a library 218.

The security management module 214 generates a pair of encryption key used for generating a digital signature value of the system security manager or the user at a short/remote distance. The pair of encryption keys includes a secret key and a public key. Also, the security management module 214 issues a certificate based on the encryption keys and the digital signature value.

The kernel level of the server computer includes a system call interface block 232, a file subsystem 234, a process control subsystem 236, a security kernel 238, a device driver 240 and a hardware controller 242.

The system call interface block 232 interfaces the elements in the user level with the elements of the kernel level.

The security kernel 238 verifies the digital signature, sets and inquires the access authority of the file. Also, the security kernel 238 controls an access of the file.

The hardware level of the server computer includes a driver controller, a hard disk driver, a floppy disk driver, a smart card driver, a Universal Serial Bus (USB) driver and a network driver.

These elements in the hardware level are well known to those skilled in the art. Accordingly, detailed description on these elements will be skipped in this specification.

Figure 3:
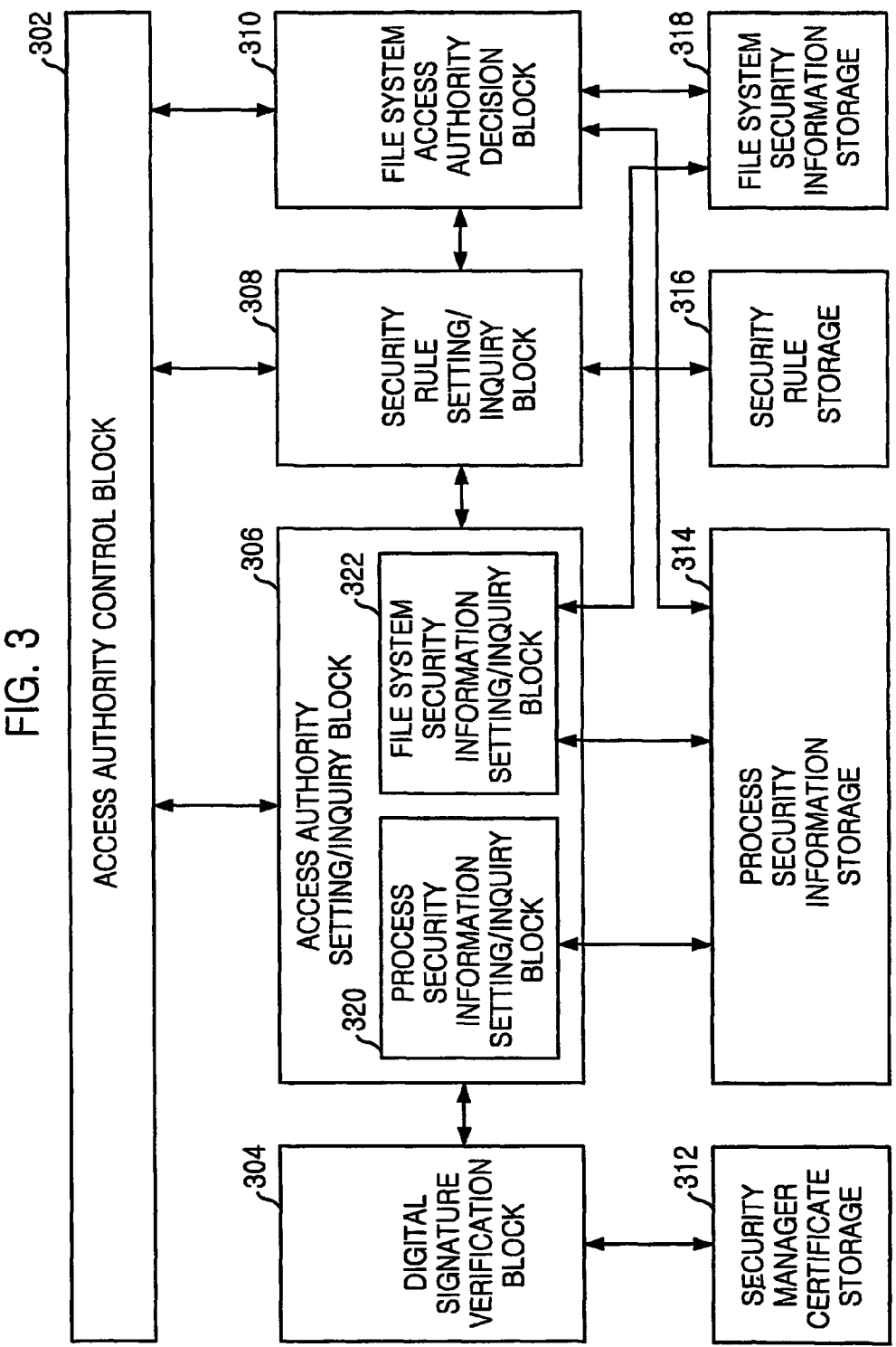
FIG. 3 is a detailed diagram of the security kernel of FIG. 2.

FIG. 3 is a detailed diagram of the security kernel of FIG. 2.

The security kernel includes an access authority control block 302, a digital signature verification block 304, an access authority setting/inquiry block 306, a security rule setting/inquiry block 308, a file system access authority decision block 310, a system security manager certificate storage 312, a process security information storage 314, a security rule storage 316 and a file system security information storage 318.

Security information related to the process is stored on the process security information storage 314, security rule information is stored on a security rule storage 316 and security information related to the file system is stored on a file system security information storage 318.

The access authority control block 302 controls the access authority setting/inquiry block 306, the security rule setting/inquiry block 308 and the file system access authority decision block 310.

The access authority setting/inquiry block 306 includes a process security information storage 320 and a file system security information setting/inquiry block 322. If a user trying to access a file is identified in the access authority control block 302, information on the process security information storage 314 is set by the process security information setting/inquiry block 320.

The file system security information setting/inquiry block 322 sets and inquires the file system security information storage 318.

The security rule setting/inquiry block 308 sets and inquires the security rules stored on the security rule storage 316.

The security rule setting/inquiry block 308 communicates with the access authority setting/inquiry block 306 and the file system access authority decision block 310 and provides information necessary for an access control based on the security rules stored on the security rule storage 316.

The file system access authority decision block 310 compares information stored on the process security information storage 314 with the file system security information stored on the file system security information storage 318. The file system access authority decision block 310 determines whether an access authority is provided to the user based on the security rule stored on the security rule storage.

Figure 4:
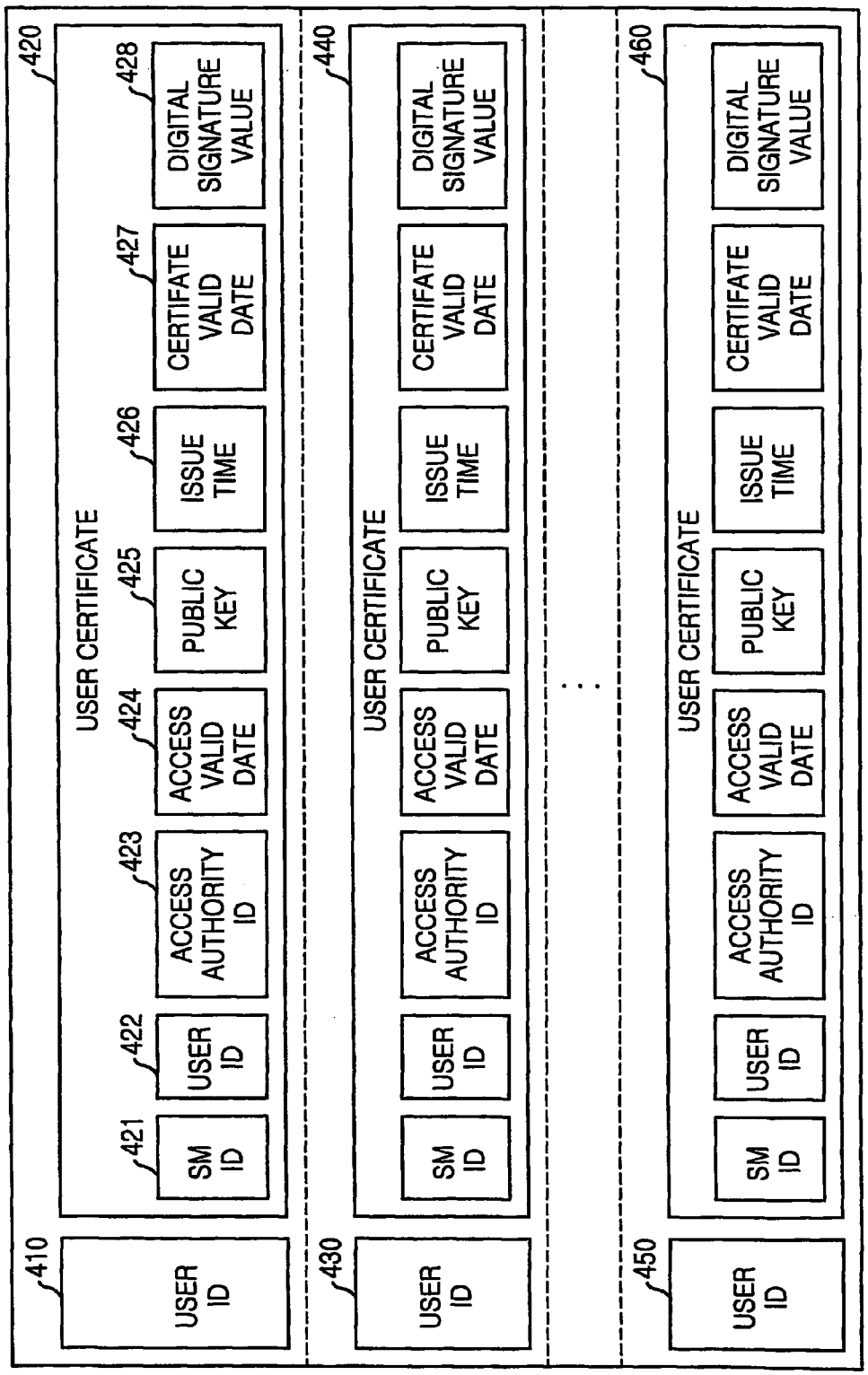
FIG. 4 is a detailed diagram of the certificate storage of FIG. 2.

FIG. 4 is a detailed diagram of the certificate storage of FIG. 2.

The certificate storage 212 includes a plurality of certificates. The certificates include a user identification (ID) 410, 430 and 450 and a user certificate 420, 440 and 460. Each of the user identifications (ID) 410 represents the user possessing each of the user certificates 420. The pair of certificate is added, deleted or searched in accordance with a control signal from the security management module 214 of FIG. 2.

The user certificate 420 includes a system security manager identification (SM ID) 421, a user identification 422, an access authority identification (ID) 423, an access valid date 424, a public key 425, an issue time 426, a certificate valid date 427 and a digital signature value 428.

The system security manager identification 421 represents a system security manager SM who issues the user certificate.

The user identification 422 represents a user possessing the user certificate 420.

The access authority identification (ID) 423 represents an access authority of the user.

The access valid date 424 represents a valid time. The user can access the file system by the valid time.

The public key 425 is used for verifying a digital signature of a user. The issue time 426 represents a time on which the user certificate is issued.

The digital-signature value 428 represents a value digital-signed of the user certificate except the digital signature value 428 by using a secret key of the system security manager.

Figure 5:
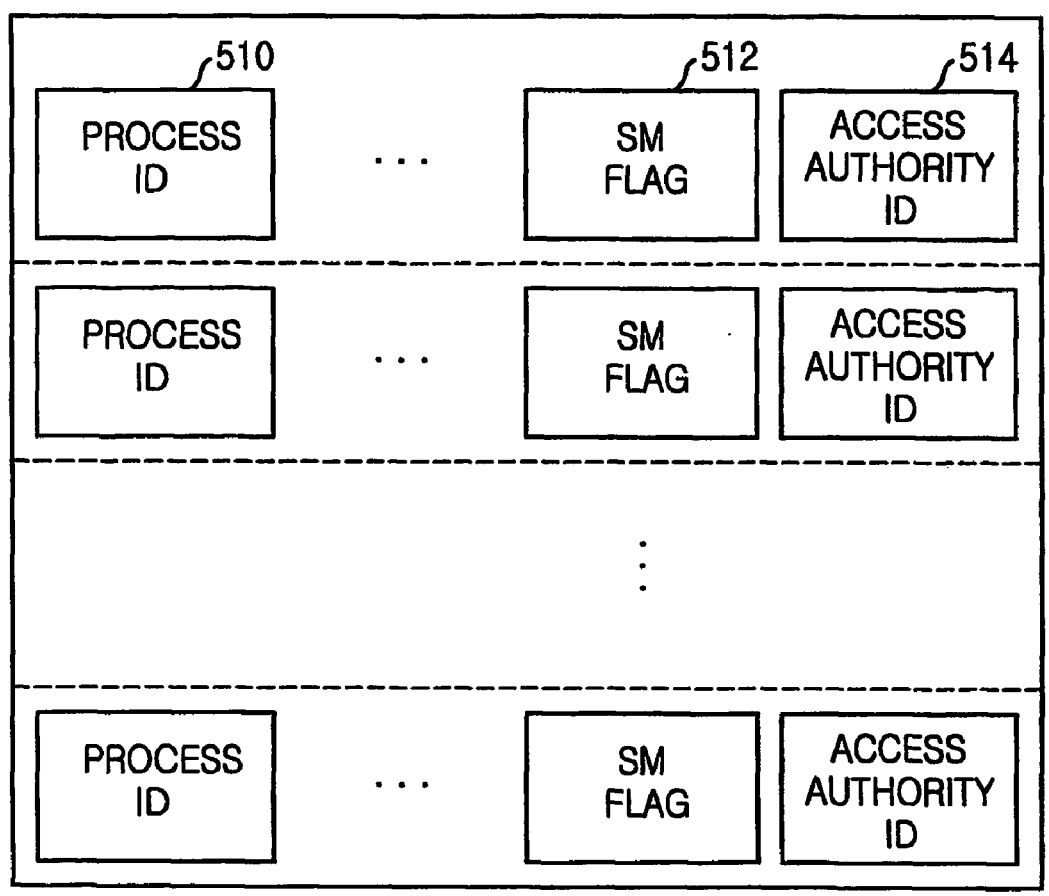
FIG. 5 is a detailed diagram of the process security information storage in the security kernel of FIG. 3.

FIG. 5 is a detailed diagram of the process security information storage in the security kernel in FIG. 3.

In the process security information storage 314, a plurality of process identifications (ID) 510, system security manager flags 512 and access authority identifications (ID) 514 are stored. The process security information storage 314 searches the process identification 510 to be accessed. After finding the process ID, the process security information storage 314 sets or inquires a corresponding system security manager flag or access authority identification in accordance with a control signal from the process security information setting/inquiry block 320, the file system security information setting/inquiry block 322 or the file system access authority decision block 310.

Each of the process IDs 510 represents a process executed by the user.

Each of the system security manager flags 512 represents a system security manager by which a process is executed. Each of the access authority ID 514 represents an access authority permitted to the process.

Figure 6:
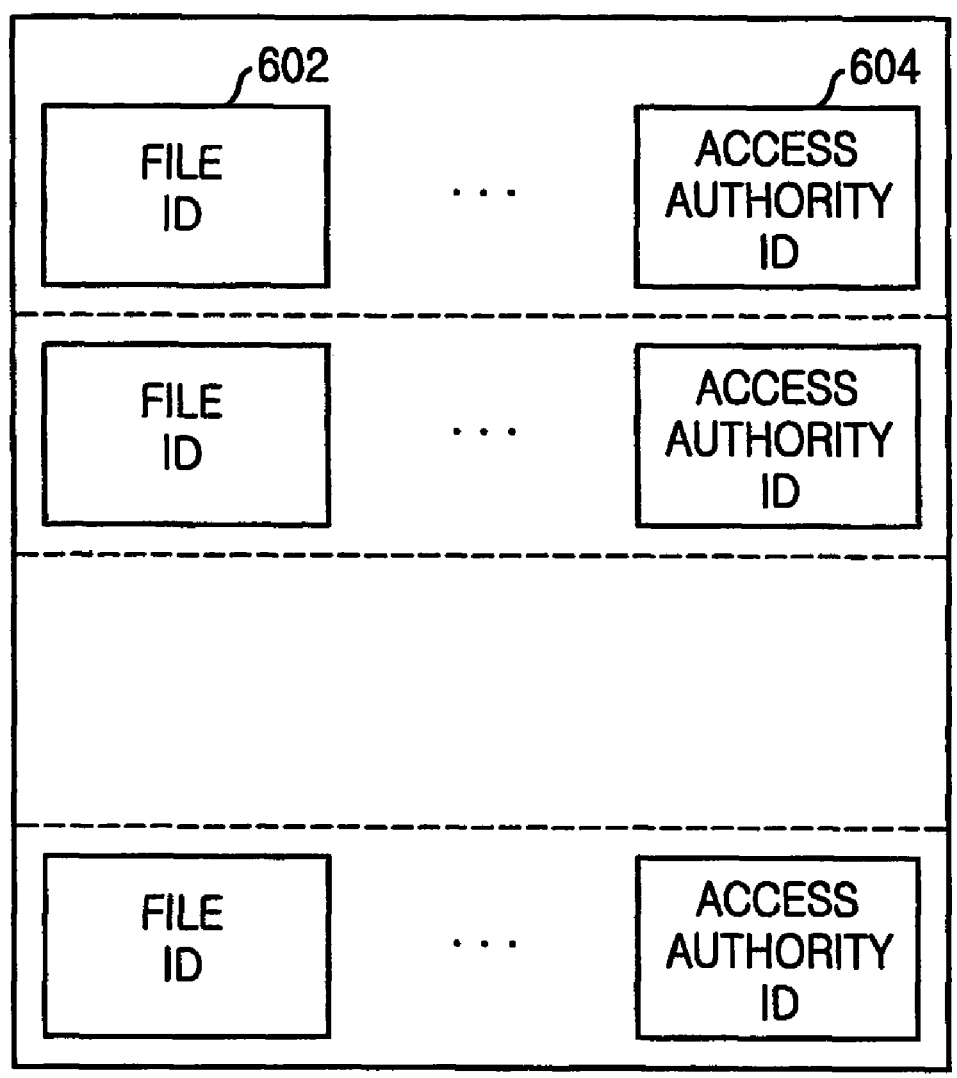
FIG. 6 is a detailed diagram of a file security information storage in the security kernel of FIG. 3.

FIG. 6 is a detailed diagram of a file system security information storage in the security kernel. The file system security information storage 318 of FIG. 3 includes a file identification (ID) 602 and an access authority identification (ID) 604. The access authority identification (ID) 604 corresponding to the file identification (ID) 602 is set or inquired in accordance with a control signal the file system security information setting/inquiry block 322 or the file system access authority decision block 310.

The file identification (ID) 602 represents an identification used for identifying a file. The access authority identification (ID) 604 represents an access authority of the user allowed to access the file.

Figure 7:
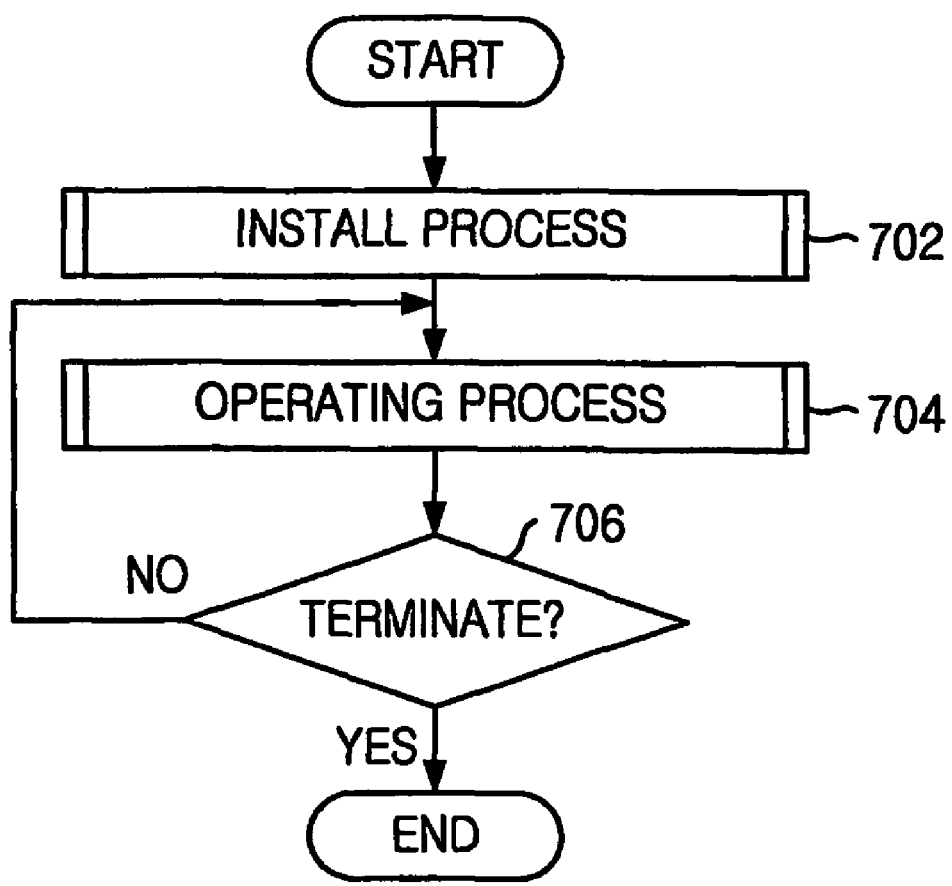
FIG. 7 is a flow chart illustrating a method for operating a file protecting method in accordance with the present invention.

FIG. 7 is a flow chart illustrating a method for operating a file protecting method in accordance with the present invention.

First, an install process for setting a system security manager is performed at step 702. Next, an operating process is performed at step 704. In the operating process, a user registering/deleting process, a file access authority setting process or a file accessing process is performed after user authentication. Then, it is determined whether the file protecting method is terminated or not at step 706. If the method is not terminated, the process continues to step 704. If so, the method ends.

Figure 8:
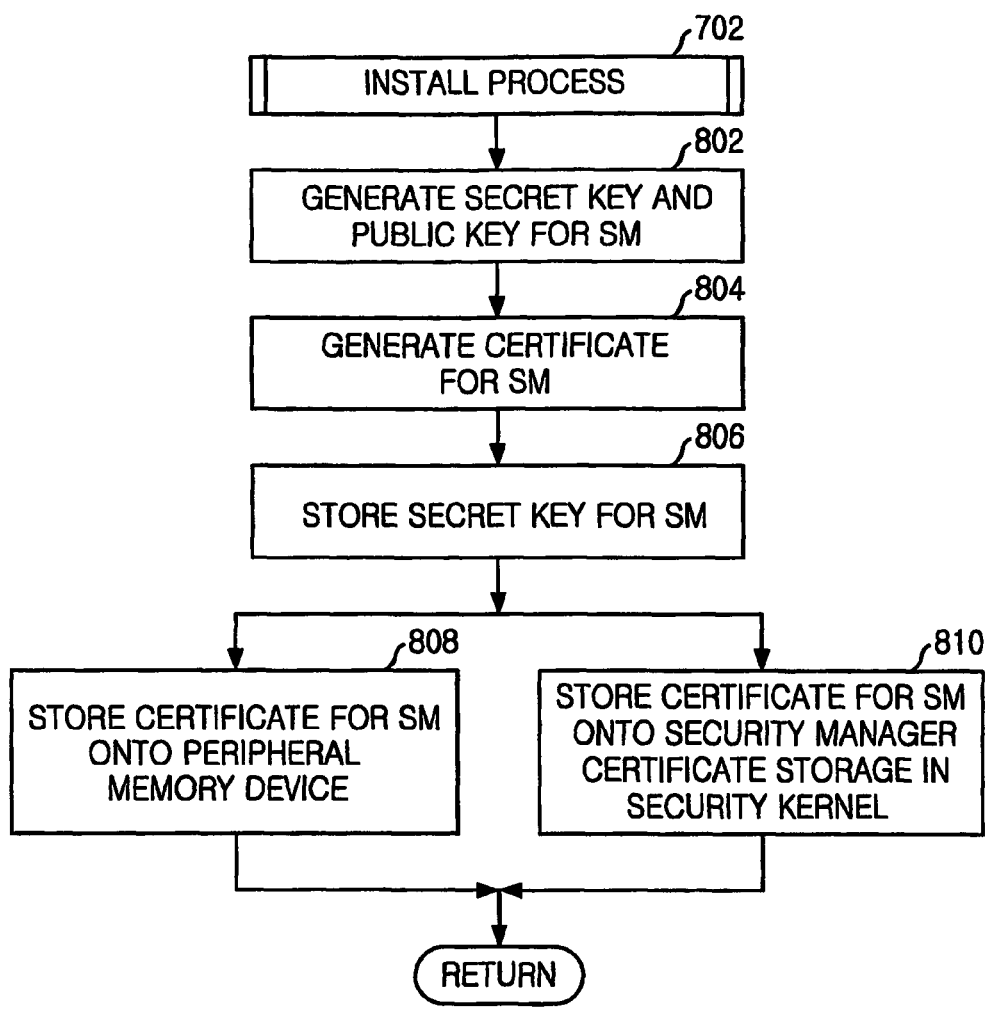
FIG. 8 is a flow chart illustrating a method for installing the file protecting method on a server computer in accordance with the present invention.

FIG. 8 is a flow chart illustrating a method for installing the file protecting method on a computer in accordance with the present invention.

First, the server computer generates a pair of keys for the system security manager, a public key PK_SM and a secret key SK_SM at step 802.

The sever computer generates a certificate for the system security manager at step 804. System security manager's access authority ACID_SM and system security manager's public key PK_SM are digital-signed by system security manager's secret key SK_SM, thereby generating the certificate for the system security manager.

The system security manager encrypts his/her secret key SK_SM and stores the encrypted secret key onto a memory device, e.g., a smart card or a floppy disk at step 806.

The system security manager stores his/her certificate CERT_SM onto a memory device, e.g., a smart card or a floppy disk at step 808. Also, the system security manager stores his/her certificate CERT_SM onto the system security manager certificate storage 312 in the security kernel 238 at step 810.

The install process is terminated and returns to step 704.

Figure 9:
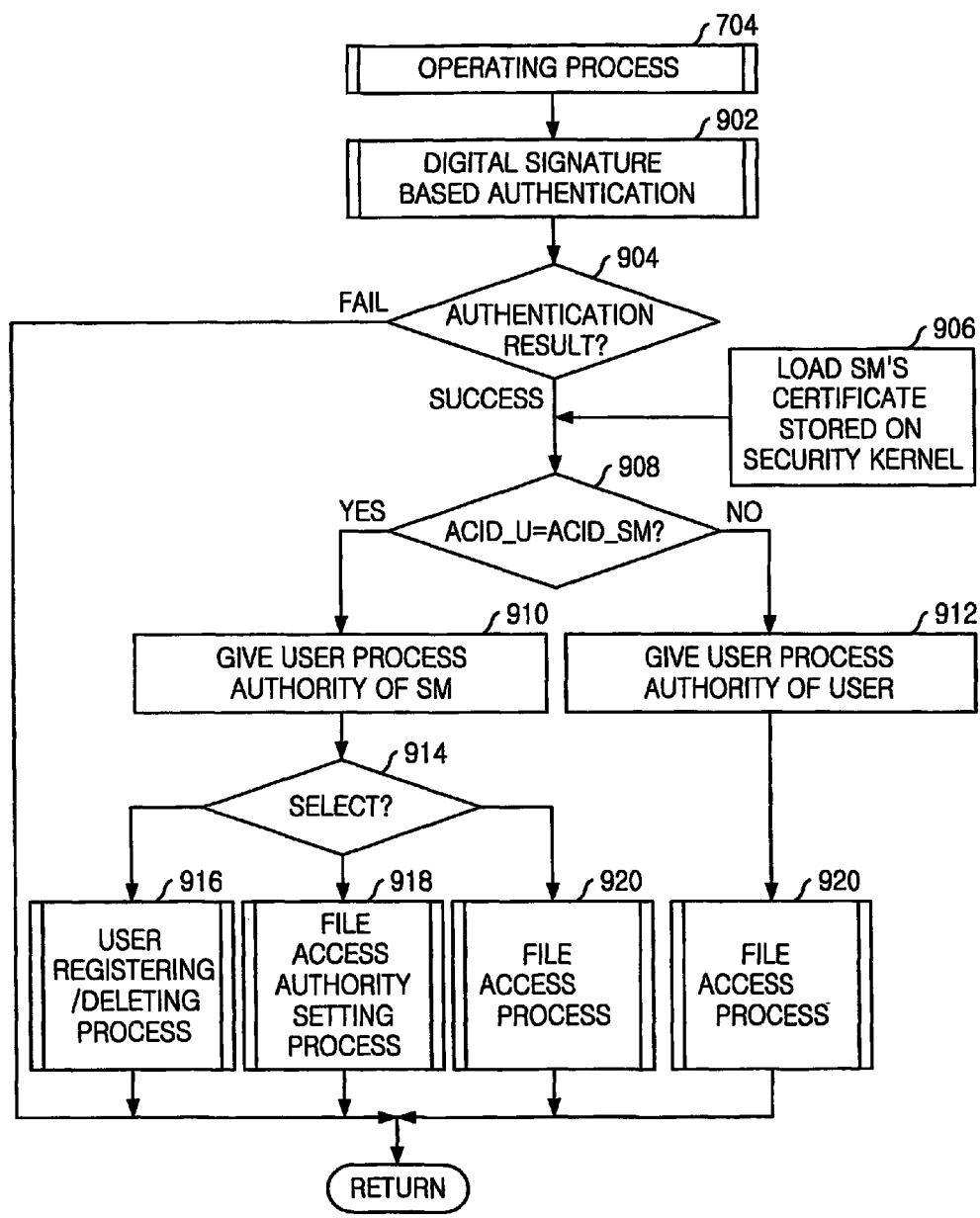
FIG. 9 is a flow chart illustrating a method for operating the file protecting method in accordance with the present invention.

FIG. 9 is a flow chart illustrating a method for operating the file protecting method in accordance with the present invention.

First, the server computer verifies a system security manager or a user trying to access itself by using digital signature based authentication at step 902. It is determined whether authentication result is success or fail at step 904.

If the authentication result is fail, the process terminates.

If the authentication result is success, the process goes to step 906 to load system security manager's certificate stored onto the system security manager certificate storage 312 and extracts system security manager's access authority ACID_SM from system security manager's certificate. And then, the process continues to step 908 to determine whether user's access authority ACID_U is equal to system security manager's access authority ACID_SM.

If user's access authority ACID_U is equal to system security manager's access authority ACID_SM, system security manager's access authority is applied to an access authority of a user process ACID_UP at step 910. The user process having system security manager's access authority ACID_SM selects and executes one of a user registering/deleting process, a file system access authority setting process and a file access process at steps 914, 916, 918 and 920.

If not, user's access authority ACID_U is applied to an access authority ACID_UP of a user process at step 912. The user process executes a file access process at step 920.

Then, the process returns to step 706.

Figure 10:
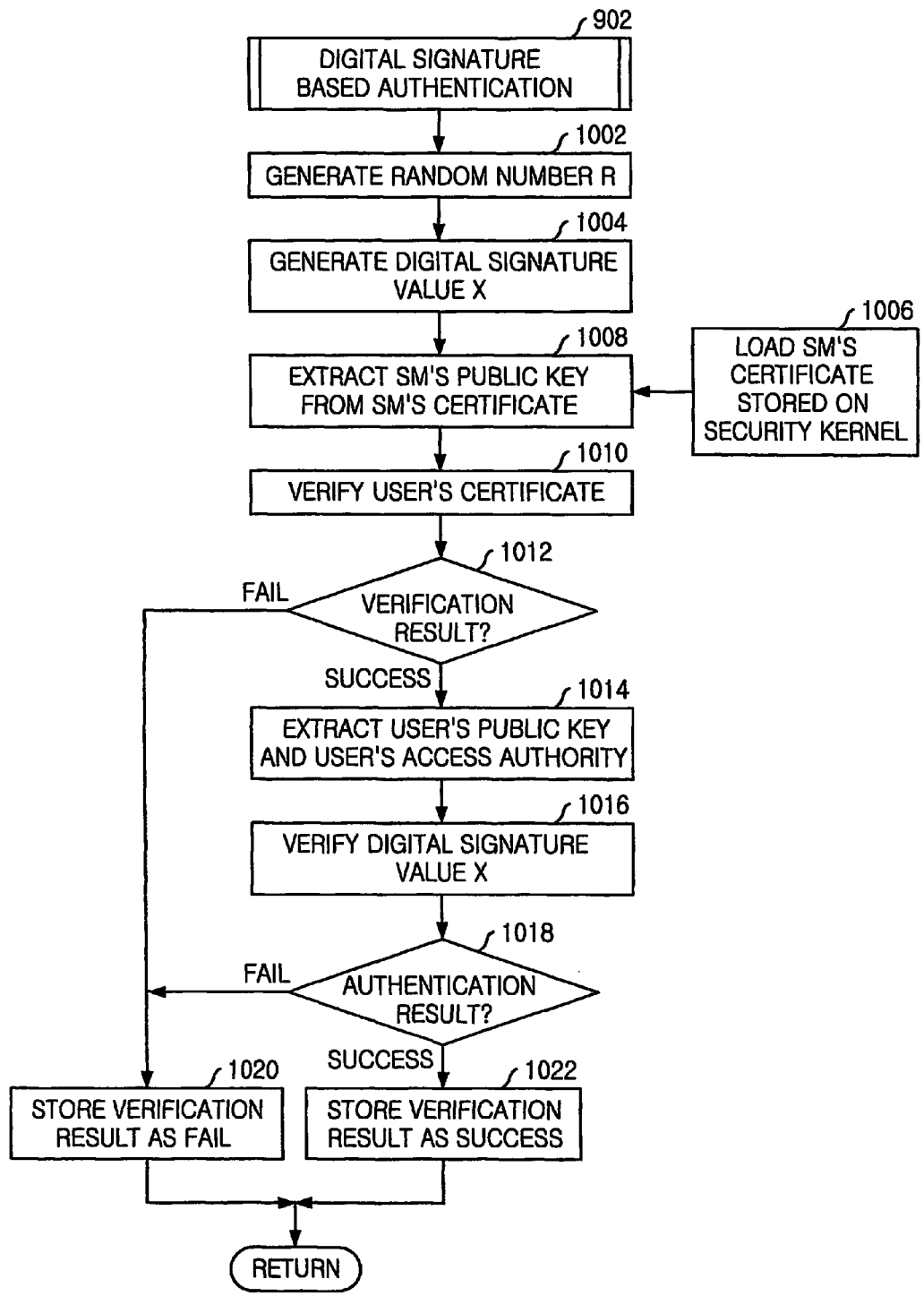
FIG. 10 is a flow chart illustrating a digital signature based authentication in accordance with the present invention.

FIG. 10 is a flow chart illustrating a digital signature based authentication process in accordance with the present invention.

The server computer generates a random number R at step 1002. The user generates a digital-signature value X to the random number R by using its secret key at step 1004. The server computer loads system security manager's certificate CERT_SM stored in the system security manager certificate storage in the security kernel 238 at step 1006. The server computer extracts the public key PK_SM of the system security manager from the certificate CERT_SM of the system security manager, the certificate CERT_SM being stored on the security kernel, at step 1008.

The certificate CERT_U of the user is verified by the security kernel 238 at step 1010. Then, it is determined whether verification result is success or fail at step 1012. If the verification result is fail, the process stores the verification result as a fail and terminates.

If the verification result is success, the security kernel extracts the public key PK_U and the access authority ACID_U of the user from the certificate CERT_U of the user at step 1014. After extracting the public key and the access authority for the client user, the security kernel verifies the digital signature value X to the random number R at step 1016. If an authentication result is success, the process stores the authentication result as a success and returns the access authority ACID_U of the user to the step 904 in order to be used at step 908.

Figure 11:
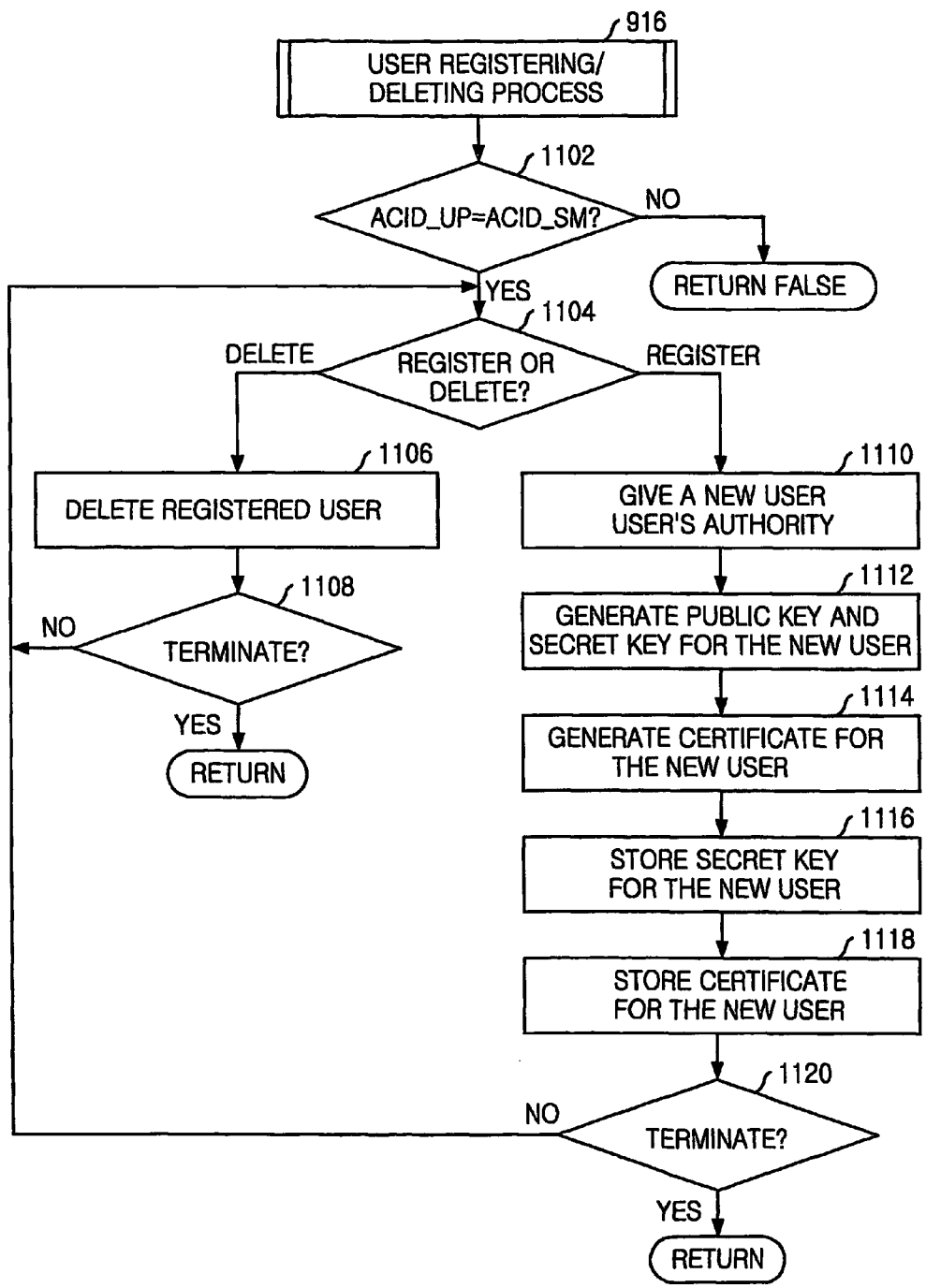
FIG. 11 is a flow chart illustrating a method for registering/deleting a user in accordance with the present invention.

FIG. 11 is a flow chart illustrating the user registering/deleting process in accordance with the present invention.

First, it is determined whether the access authority ACID_UP of the user process is equal to that ACID_SM of the system security manager at step 1102. If the access authority ACID_UP of the user process is not equal to that ACID_SM of the system security manager, the process terminates and returns.

If the access authority ACID_UP of the user process is equal to that ACID_SM of the system security manager, the process continues the step 1104 to select a user registering process or a user deleting process.

If the user deleting process is selected, the user process having the access authority of the system security manager deletes the registered user at step 1106.

If the user registering process is selected, the user process having the access authority of the system security manager gives an access authority to a new user at step 1110. The user process generates a public key PK_U and a secret key SK_U for the new user at step 1112.

The system security manager encrypts the access authority and the public key for the new user by using its secret key, thereby generating a certificate CERT_U for the new user at step 1114. The new user encrypts its secret key and stores the encrypted secret key onto a memory device, e.g., a smart card or a floppy diskette at step 1116. The new user stores its certificate CERT_U onto the memory at step 1118.

Then, it is determined whether the process is terminated or not at step 1120. If the process is terminated, the process returns. If not, the process goes to the step 1104 to select a user registering process or a user deleting process.

Figure 12:
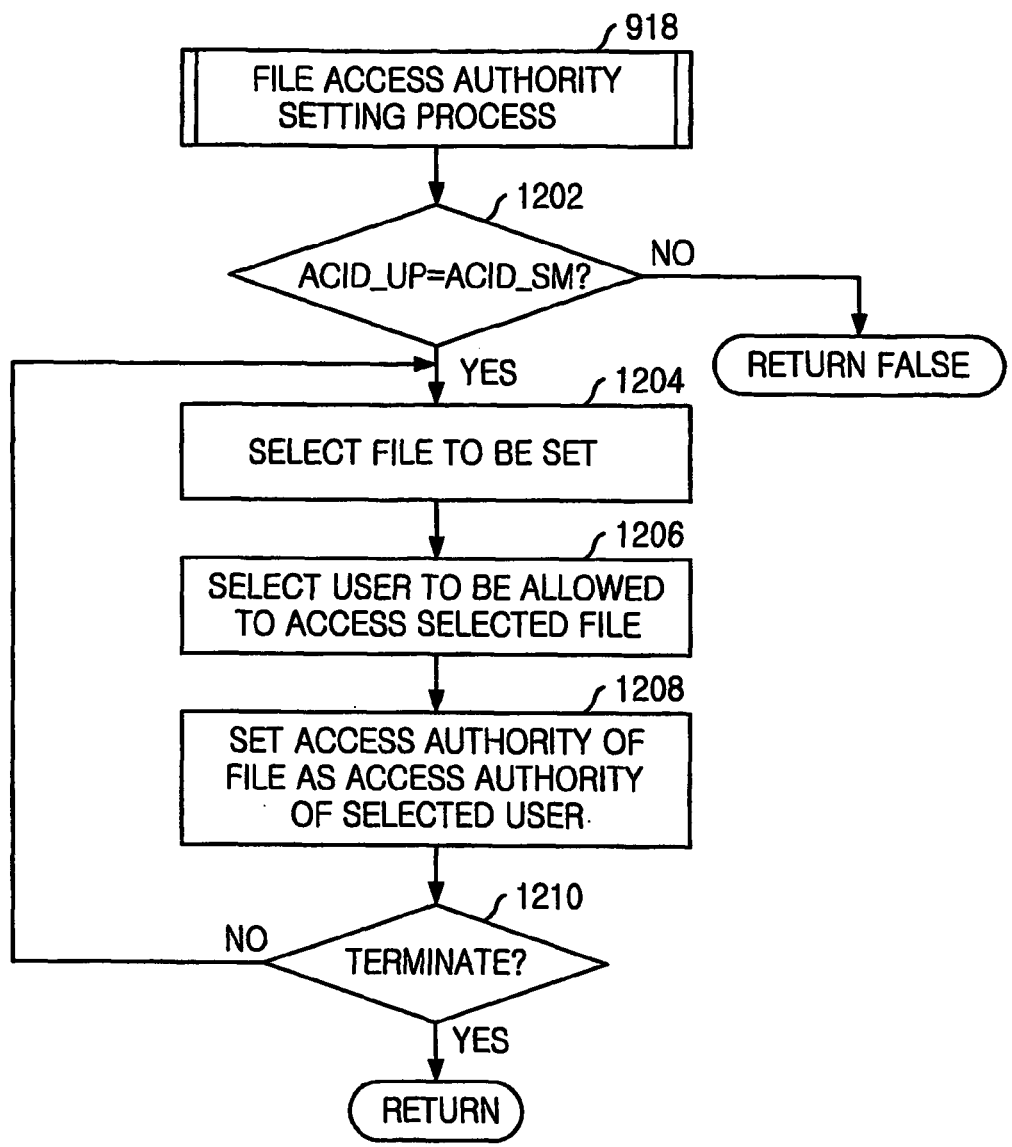
FIG. 12 is a flow chart illustrating a method for setting an access authority of a file in accordance with the present invention.

FIG. 12 is a flow chart illustrating a file access authority setting process in accordance with the present invention.

First, it is determined whether the access authority ACID_UP of the user process is equal to that ACID_SM of the system security manager at step 1202. If the access authority ACID_UP of the user process is equal to that ACID_SM of the system security manager, the system security manager selects a file of which access authority is to be set at step 1204. If not, the process terminates.

The system security manager selects users who are allowed to access the file at step 1204. The security kernel sets an access authority ACID_F of the file selected at the step 1204 as the access authority ACID_U of the user selected at the step 1206 at step 1208. Then, it is determined whether the process is terminated at step 1210. If the server computer selects termination, the process terminates. If not, the process continues to the step 1204.

Figure 13:
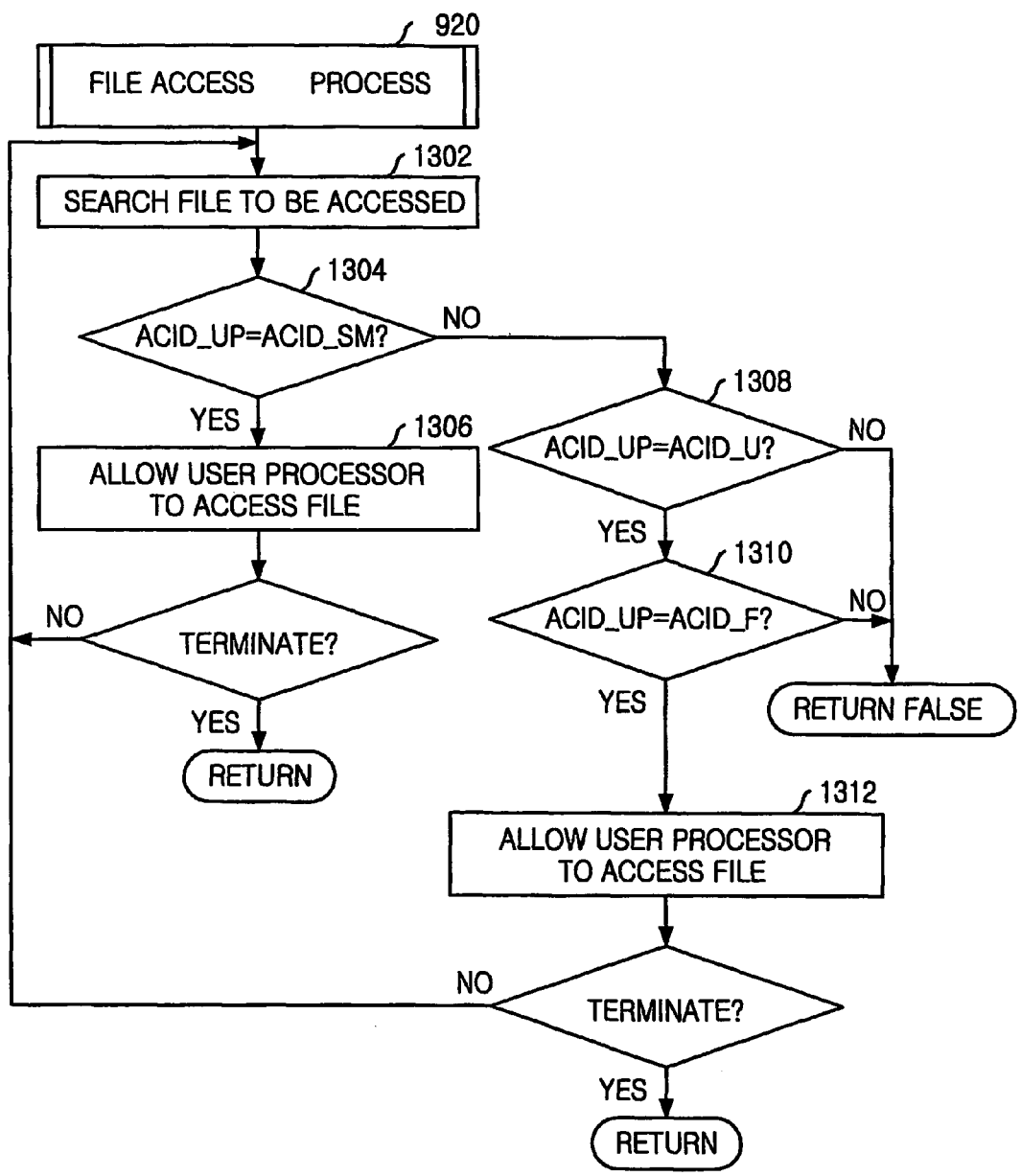
FIG. 13 is a flow chart illustrating a method for processing a file.

FIG. 13 is a flow chart illustrating a method for processing a file.

The security kernel obtains a file to be accessed at step 1302. The security kernel compares the access authority ACID_UP of the user process trying to access the file with the access authority ACID_SM of the system security manager at step 1304.

If the access authority ACID_UP of the user process is equal to that ACID_SM of the system security manager, the server computer permits the user process to access the file F at step 1306. Then, it is determined whether the process is terminated. If the sever computer selects termination, the process terminates. If not, the process continues to the step 1302.

If the access authority of the client user process is not equal to that of the system security manager, the process goes to step 1308 to determine whether the access authority of the user process ACID_UP is equal to that ACID_UP of the user at step 1308. If not, the process terminates.

If the access authority ACID_UP of the user process is equal to that ACID_SM of the user, it is determined whether the access authority ACID_UP of the user process is equal to that ACID_F of the file F at step 1310. If not, the process terminates.

If the access authority ACID_UP of the user process is equal to that ACID_F of the file F, the server computer permits the user process to access the file at step 1312. Then, it is determined whether the process is terminated. If the server computer selects termination, the process terminates. If not, the process continues to the step 1302.

The file protecting system in accordance with the present invention stores the certificate of the system security manager onto the security kernel in the kernel level at system install process. Also, the digital signature based authentication, a file access authority setting process and a file access process are performed in the kernel level not in the user level. Accordingly, the file protecting system can fundamentally prevents the file system from being forged or altered.

Therefore, the file protecting system in accordance with the present invention provides a stable and reliable file system. For example, the file protecting system in accordance with the present invention can protect a web server system operating a homepage from a hacking.

Although the preferred embodiments of the invention have been disclosed for illustrative purpose, those skilled in the art will be appreciate that various modifications, additions and substitutions are possible, without departing from the scope and spirit of the invention as disclosed in the accompanying claims.

What is claimed is:

1. A method for protecting a file system on a server computer, the method comprising:
    generating a system security manager's digital signature key pair and certificate;
    storing the system security manager's certificate onto a security kernel of an operating system on the server computer based upon a digital signature of the system security manager;
    generating a user's digital signature key pair and a user's certificate signed using a secret key of the system security manager's digital signature key pair;
    setting an access authority of the file system for the user's certificate;
    identifying a user through a digital signature-based authentication using the system security manager's certificate and the user's certificate, when the user attempts to access the file system on the server computer; and
    granting the user access authority for a file in accordance with the access authority of the file system set for the user's certificate only when the identifying is successful.

2. The method as recited in claim 1, further comprising:
    performing a user registering/deleting process when the user is identified as the system security manager.

3. The method as recited in claim 1, further comprising:
    setting the access authority of the file system when the user is identified as the system security manager.

4. The method as recited in claim 1, further comprising:
    accessing and processing a file.

5. The method as recited in claim 1, wherein generating the system security manager's digital signature key pair and certificate comprises:
    generating a public key of the system security manager's digital signature key pair;
    generating the secret key of the system security manager's digital signature key pair; and
    generating the system security manager's certificate.

6. The method as recited in claim 1, wherein identifying the user through a digital signature-based authentication comprises:
    generating, at the server computer, random numbers;
    generating a digital signature to the random number;
    extracting a public key of the system security manager's digital signature key pair from the system security manager's certificate stored on the security kernel;
    verifying the user's certificate using the extracted system security manager's public key;
    extracting a public key of the user's digital signature key pair and the access authority in the user's certificate; and
    verifying the digital signature to the random number.

7. The method as recited in claim 1, wherein granting the user the access authority comprises:
    providing the user with the access authority to the file system when the user is a general user; and
    providing the user with registering/deleting authority, file system access setting authority and the file system access authority.

8. The method as recited in claim 2, wherein performing the user registering/deleting process comprises:
    determining whether user registration or deletion is selected;

deleting data related to a user to be deleted when the user deletion is selected;

registering a user when the user registration is selected;

wherein registering the user comprises:

provoiding the user to be registered with the access authority;

generating a secret key and a public key of the user to be registered;

generating a certificate of the user to be registered;

encrypting and storing the secret key of the user to be registered; and storing the certificate of the user to be registered.

9. The method as recited in claim 8, wherein the certificate of the user to be registered is generated by encrypting the access authority and the user's public key.

10. The method as recited in claim 3, wherein setting the access authority comprises:

selecting a file;

selecting a user allowed to access the file; and setting the access authority to the file as an access authority of the user.

11. The method as recited in claim 4, wherein accessing and processing the file comprises:

receiving a name of a file to be accessed;

determining whether an access authority of the file to be accessed is equal to that of the system security manager;

permitting the file to be accessed when the access authority of the file to be accessed is equal to that of the system security manager;

determining whether the access authority of the file to be accessed is equal to that of the user trying to access thereto; and permitting the file to be accessed when the access authority of the file to be accessed is equal to that of the user trying to access thereto.

12. An apparatus for protecting a file system on a server computer, the apparatus comprising:

a generator that generates a system security manager's digital signature key pair and certificate;

a storage that stores the system security manager's certificate onto a security kernel of an operating system on the server computer based upon a digital signature of the system security manager;

a generator that generates a user's digital signature key pair and a user's certificate signed using a secret key of the system security manager's digital signature key pair;

an access setter that sets an access authority of the file system for the user's certificate;

an identifier that identifies a user through a digital signature-based authentication using the system security manager's certificate and the user's certificate, when the user tries to access the file system on the server computer; and an authorizer that grants the user access authority for a file in accordance with the access authority of the file system set for the user's certificate only when the identifying is successful.

13. The apparatus as recited in claim 12, further comprising:

a registrar/deleter that performs a registration/deletion of the user when the user is identified as the system security manager.

14. The apparatus as recited in claim 12, further comprising:

an access setter that sets the access authority of the file system when the user is identified as the system security manager.

15. The apparatus as recited in claim 12, further comprising:

an accessor that accesses a file and a processor that processes the file.

16. The apparatus as recited in claim 12, wherein the generator that generates the system security manager's digital signature key pair and system security manager's certificate comprises:

a generator that generates a public key of the system security manager's digital signature key pair;

a generator that generates the secret key of the system security manager's digital signature key pair; and a generator that generates a system security manager's certificate.

17. The apparatus as recited in claim 12, wherein the identifier comprises:

a generator that generates, at the server computer, random numbers;

a generator that generates a digital signature to the random number;

an extractor that extracts a public key of the system security manager's digital signature key pair from a system security manager's certificate stored on the security kernel;

a verifier that verifies a user's certificate using the extracted system security manager's public key;

an extractor that extracts a public key of the user's digital signature key pair and the access authority in the user's certificate; and a verifier that verifies the digital signature to the random number.

18. The apparatus as recited in claim 12, wherein the authorizer comprises:

a provider that provides the user with the file system access authority to the file system when the user is a general user; and a provider that provides the user with registering/deleting authority, file system access setting authority and the file system access authority.

19. The apparatus as recited in claim 13, wherein the registrar/deleter comprises:

a determiner that determines whether user registration or deletion is selected;

a deleter that deletes data related to a user to be deleted when the user deletion is selected;

a registrar that registers a user when the user registration is selected;

wherein the registrar comprises:

a provider that provides the user to be registered with the access authority;

a generator that generates a user's secret key and public key to be registered;

a generator that generates a user's certificate to be registered;

an encrypter that encrypts the user's secret key to be registered and a storage that stores the user's secret key to be registered; and a storage that stores the user's certificate to be registered.

20. The apparatus as recited in claim 19, wherein the user's certificate is generated by encrypting the access authority of the user and user's public key.

21. The apparatus as recited in claim 14, wherein the access setter includes:
  a selector that selects a file;
  a selector that selects a user allowed to access the file; and
  an access setter that sets the access authority to the file as an access authority of the user.

22. The apparatus as recited in claim 15, wherein the accessor and processor comprise:
  a receiver that receives a name of a file to be accessed;
  a determiner that determines whether an access authority of the file to be accessed is equal to that of the security manager;
  a permitter that permits the file to be accessed when the access authority of the file to be accessed is equal to that of the security manager;
  a determiner that determines whether the access authority of the file to be accessed is equal to that of the user trying to access thereto; and
  a permitter that permits the file to be accessed when the access authority of the file to be accessed is equal to that of the user trying to access thereto.

23. A computer readable media storing instructions for executing a method for protecting a file system on a server computer, the computer readable medium comprising:
  a first generating code segment that generates a system security manager's digital signature key pair and certificate;
  a storing code segment that stores a system security manager's certificate onto a security kernel of an operating system on the server computer based upon a digital signature of the system security manager;
  a second generating code segment that generates a user's digital signature key pair and a user's certificate signed using a secret key of the system security manager's digital signature key pair;
  an access setting code segment that sets an access authority of the file system for the user's certificate;
  a user identifying code segment that identifies a user through a digital signature-based authentication using the system security manager's certificate and the user's certificate, when the user tries to access the file system on the server computer; and
  an access granting code segment that grants the user access authority for a file in accordance with the access authority of the file system set for the user's certificate only when the identifying is successful.

24. The computer readable media as recited in claim 23, further comprising:
  a registering/deleting code segment that performs a user registering/deleting process when the user is identified as the system security manager.

25. The computer readable media as recited in claim 23, further comprising:
  an access setting code segment that sets the access authority of the file system when the user is identified as the system security manager.

26. The computer readable media as recited in claim 23, further comprising:
  an accessing code segment that accesses a file and a processing code segment that processes a file.

27. The computer readable media as recited in claim 23, the first generating code segment comprising:
  a public key generating code segment that generates a public key of the system security manager's digital signature key pair;
  a secret key generating code segment that generates the secret key of the system security manager's digital signature key pair; and
  a certificate generating code segment that generates a system security manager's certificate.

28. The computer readable media as recited in claim 23, the user identifying code segment comprising:
  a random number generating code segment that generates, at the server computer, random numbers;
  a digital signature generating code segment that generates a digital signature to the random number;
  a public key extracting code segment that extracts a public key of the system security manager's digital signature key pair from the system security manager's certificate stored on the security kernel;
  a certificate verifying code segment that verifies a user's certificate using the extracted system security manager's public key;
  a public key and access authority extracting code segment that extracts a public key of the user's public digital signature key pair and the access authority in the user's certificate; and
  a signature verifying code segment that verifies the digital signature to the random number.

29. The computer readable media as recited in claim 23, wherein the access granting code segment comprises:
  an access authorizing code segment that provides the user with the file system access authority to the file system when the user is a general user; and
  a registering/deleting authority code segment that providing the user with registering/deleting authority, file system access setting authority and the file system access authority.

30. The method as recited in claim 24, wherein the registering/deleting code segment comprises:
  a determining code segment that determines whether user registration or deletion is selected;
  a deleting code segment that deletes data related to a user to be deleted when the user deletion is selected;
  a registering code segment that registers a user when the user registration is selected;
  wherein the registering code segment comprises:
  an access authorizing code segment that providing the user to be registered with the access authority;
  a user key generating code segment that generates a secret key and a public key of the user to be registered;
  a certificate generating code segment that generates a certificate of the user to be registered;
  an encrypting and storing code segment that encrypts and stores the secret key of the user to be registered; and
  a storing code segment that stores the certificate of the user to be registered.

31. The computer readable media as recited in claim 30, wherein the certificate is generated by encrypting the access authority and user's public key.

32. The computer readable media as recited in claim 25, wherein the access setting code segment comprises:
  a file selecting code segment that selects a file;
  a user selecting code segment that select a user allowed to access the file; and
  an access authority setting code segment that sets the access authority to the file as an access authority of the user.

33. The computer readable media as recited in claim 26, wherein the accessing and processing code segment comprises:

a name receiving code segment that receives a name of a file to be accessed;

a first access determining code segment that determines whether an access authority of the file to be accessed is equal to that of the system security manager;

a permitting code segment that permits the file to be accessed when the access authority of the file to be accessed is equal to that of the system security manager;

an second access determining code segment that determines whether an access authority of the file to be accessed is equal to that of the user trying to access the file; and an access permitting code segment that permits the file to be accessed when the access authority of the file to be accessed is equal to that of the user trying to access the file.

* * * * *